(12) United States Patent
Lovitt

(10) Patent No.: US 10,031,737 B2
(45) Date of Patent: Jul. 24, 2018

(54) DOWNLOADING AND DISTRIBUTION OF APPLICATIONS AND UPDATES TO MULTIPLE DEVICES

(75) Inventor: Andrew Lovitt, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/397,695

(22) Filed: Feb. 16, 2012

(65) Prior Publication Data
US 2013/0219381 A1    Aug. 22, 2013

(51) Int. Cl.
G06F 9/44         (2006.01)
G06F 8/65         (2018.01)

(52) U.S. Cl.
CPC .................................. *G06F 8/65* (2013.01)

(58) Field of Classification Search
USPC .......................................................... 717/173
See application file for complete search history.

(56) References Cited

U.S. PATENT DOCUMENTS

| | | | | |
|---|---|---|---|---|
| 6,405,362 B1 * | 6/2002 | Shih et al. | | 717/174 |
| 6,782,527 B1 * | 8/2004 | Kouznetsov et al. | | 717/103 |
| 7,313,384 B1 | 12/2007 | Meenan et al. | | 455/410 |
| 7,533,061 B1 * | 5/2009 | Cheng et al. | | 705/50 |
| 7,735,078 B1 * | 6/2010 | Vaidya | | 717/171 |
| 2003/0196096 A1 * | 10/2003 | Sutton | | 713/181 |
| 2005/0021967 A1 * | 1/2005 | Bruekers | | G06F 21/10 713/176 |
| 2007/0265022 A1 | 11/2007 | Bengtsson et al. | | |
| 2008/0229304 A1 * | 9/2008 | Bengtsson et al. | | 717/178 |
| 2009/0063266 A1 * | 3/2009 | Blanch et al. | | 705/14 |
| 2009/0249277 A1 * | 10/2009 | Prakash | | G06F 8/60 717/100 |
| 2010/0312817 A1 | 12/2010 | Steakley | | |

(Continued)

FOREIGN PATENT DOCUMENTS

WO    2005/109829 A1    11/2005

OTHER PUBLICATIONS

"One Website for All Devices", Retrieved at <<http://codecanyon.net/item/one-website-for-all-devices/261994>>, Retrieved Date: Dec. 26, 2011, pp. 9.

(Continued)

*Primary Examiner* — Hang Pan
(74) *Attorney, Agent, or Firm* — Fogarty LLP

(57) ABSTRACT

Multiple devices having different architecture or platforms may be supported by the same application store. The related devices are used to synchronize the state of each device in a group, such as all the devices owned or used by a particular user. The devices themselves are used as separate payload delivery systems that are capable of sharing software, such as new or updated applications and operating systems, among the different types of devices in the group. A software payload may be created by a server that contains software for more than one device's architecture. They payload may include segments targeted for different platforms or architectures. Once the payload is loaded on one device, that device can then send the payload to the other devices within the group. Each device that receives the payload uses the appropriate software segment for its particular architecture or platform.

15 Claims, 4 Drawing Sheets

(56) References Cited

U.S. PATENT DOCUMENTS

| | | | |
|---|---|---|---|
| 2011/0010704 A1 | 1/2011 | Jeon et al. | |
| 2011/0010759 A1 | 1/2011 | Adler | |
| 2011/0225417 A1 | 9/2011 | Maharajh et al. | |
| 2011/0279863 A1 | 11/2011 | Chang et al. | |
| 2011/0289497 A1* | 11/2011 | Kiaie et al. | 717/171 |
| 2011/0307393 A1 | 12/2011 | Galuten | |
| 2013/0047146 A1* | 2/2013 | Ugur et al. | 717/172 |

OTHER PUBLICATIONS

"Adobe Extends Air Applications across Screens", Retrieved at <<http://www.adobe.com/aboutadobe/pressroom/pressmaterials/air/102510AIR2.5QuoteSheet.pdf>>, Retrieved Date: Dec. 26, 2011, pp. 3.

"Develop Mobile Applications with Oracle ADF Mobile", Retrieved at <<http://www.oracle.com/technetwork/developer-tools/jdev/adf-mobile-development-129800.pdf>>, Retrieved Date: Dec. 26, 2011, pp. 6.

Leister, Heather, "Share Purchased Apps with Multiple Devices", Retrieved at <<http://www.theiphonemom.com/share-purchased-apps-with-multiple-devices>>, Aug. 14, 2009, pp. 6.

"International Search Report", Mailed Date: Jun. 2, 2013, Application No. PCT/US2013/025478, Filed Date: Feb. 10, 2013, pp. 9.

* cited by examiner

DOWNLOADING AND DISTRIBUTION OF APPLICATIONS AND UPDATES TO MULTIPLE DEVICES

BACKGROUND

Existing applications often provide the same function and operation to users across multiple platforms with different architectures. Typically, a specific software load (i.e. program, update, extra, add-on, etc.) that is configured for a particular architecture must be provided to and loaded on each platform. A distribution CD may contain software for different platforms or configurations, but only the software that is configured for a selected architecture is loaded on a particular platform. Similarly, when application software is downloaded from a website, the software is loaded only for the selected architecture or platform. Once the software is loaded on a particular platform, it usually cannot be shared with other device having the same platform and never can be shared with devices having different architectures. Additionally, current systems do not allow for cross-platform and cross-architecture distribution, removal, sharing, or synchronization of software payloads.

Application or "App" stores are common for mobile devices and desktops. However, these application stores typically target or serve specific platforms. Specialized or new devices and devices with few users experience a critical mass problem and have difficulty encouraging application stores and developers to target these less widely-used platforms. Additionally, application store providers and OEMs typically prefer to not run individual application stores for each device or category of device.

In order to update applications on a device or to load new applications, the device must have some way to access the application store. Currently, devices that are not constantly connected to the Internet, such as vehicle navigation systems or remote sensors, are difficult to update because there is no easy what to connect these devices to an application store.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, downloads for certain devices operate as a source for other devices' applications that are purchased through the same application store. Security, pricing, and synchronization among various devices may be optionally configured for different downloads. Additionally, a remote device that is infrequently or never connected to the Internet may receive downloads and updated applications by allowing other registered devices for the same user to carry that a payload for the remote device and to act as a delivery mechanism for the remote device.

Multiple devices having different architecture or platforms may be supported by the same application store. The related devices are used to synchronize the state of each device in a group, such as all the devices owned or used by a particular user or all the devices registered on the domain or exchange server. The devices themselves are used as separate payload delivery systems that are capable of sharing software, such as new or updated applications and operating systems, among the different types of devices in the group. A software payload may be created by a server that contains software for more than one device's architecture. They payload may include segments targeted for different platforms or architectures. Once the payload is loaded on one device, that device can then send the payload to the other devices within the group. Each device that receives the payload uses the appropriate software segment for its particular architecture or platform.

In one embodiment, a first device downloads a software package from an application store. The software package comprises a first portion of software code adapted for the first device and at least one additional portion of software code that is adapted for one or more additional devices. The first portion of the software code is loaded on the first device as an executable application. The additional portion of the software code is stored in a memory on the first device. The first device and a second device later establish connection, such as a wired or wireless connection that may be direct or indirect. The first device identifies the second device as an approved destination for the software package or for the additional portion of the software package. The first device then provides at least the additional portion of the software package to the second device. The additional portion of the software code may then be loaded on the second device as an executable application.

In one embodiment, after the additional portion of the software package is provided to the second device, the additional portion of the software package may be deleted from the first device. The additional portion of the software package may or may not be runtime compatible with the first device.

The first or second device may notify the application store or a centralized synchronization node that the additional portion of the software package was provided to the second device. An application database may then be updated with the application-installation state for the first and second devices and any relevant additional devices. For each of the first device and any additional devices, a user or server may select one or more application states to be tracked in the application database.

The first device and the additional devices may be associated with a user. The user may be charged for the software package based upon of a number of devices supported by the software package. Alternatively, the user may be charged for the software package based upon of a number of devices that receive the software package.

The software package may comprise, for example, a new or updated application or operating system. The first portion of software code may be an update to an application or operating system that is already running on the first device, and the at least one additional portion of software code may be an update to a different version of the application or operating system that is running on one or more additional devices. Alternatively, the first portion and second portion may be new applications or operating systems that are adapted for different platforms or architectures.

Security may be provided or supported by associating a public-private key with the first device and the one or more additional devices. Additionally, the software package may be encrypted using these keys. These keys may also be shared between similar devices. In one embodiment, there are a multitude of devices that all need to get a software package or program. In this case, the server could encrypt the software package for that group of devices using a shared key that is shared by all of those devices. This eliminates the need to have individually encrypted packages targeting individual devices.

When selecting the content of the at least one additional portion of software code, the choice may be based upon historical device-connectivity information for the first device and the one or more additional devices.

In other embodiments, the software package may further comprise a third portion of software code that is adapted for a third device. The second device and third device detect a connection between them. The second device identifies the third device as an approved destination for the third portion of the software package. The second device then provides at least the third portion of the software code from the second device to the second device. The loading the third portion of the software code on the third device as an executable application.

In another embodiment, a software package may be downloaded from an application store to a first device. The software package may comprise software code adapted for at least second device, but not for the first device. The software code may be stored in a memory on the first device. When a connection is established between the first device and a second device, the second device may be identified as an approved destination for the software code. The software code may then be transferred from the first device to the second device. The second device may then load the software code as a new or updated application or operating system. The software code may be deleted from the first device after transfer to the second device. Additionally, a central application-state database may be updated to reflect the storage and/or installation status of the software code on the first and second devices.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
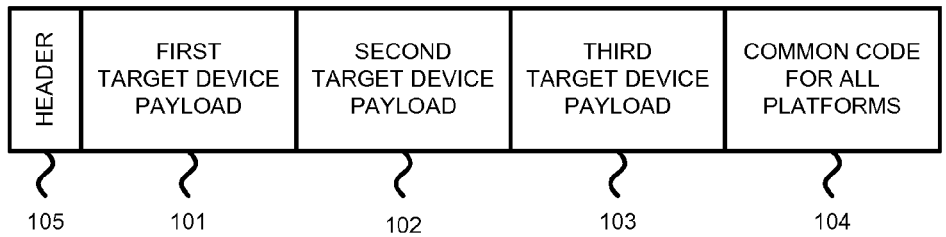
FIG. 1 is a block diagram illustrating an example layout of an application payload that is downloaded from an application store to a device or that is exchanged between two devices.

The systems and methods disclosed herein provide for and support the distribution of software, such as new or updated applications and operating systems, to a number of heterogeneous devices. An application developer may create a number of different versions of an application. Each version is designed to operate on a different target device and/or platform. For example, one version may be for a mobile device, such as mobile telephone, PDA, or tablet computer, a second version may be for a fixed device, such as a personal computer or server, and a third version may be for an embedded device, such as a vehicle navigation system. The devices may each have different architectures or instruction set. The different versions of the application may share some common code or functionality across each platform. Alternatively, the applications may comprise a number of device-specific applications that are related to each other or that connect to each other through any network, but that do not share the same functionality. This may occur, for example, when an application created for a first device is a companion to a related application created for another device. For instance, an XBOX LIVE® dashboard and a companion control application for a WINDOWS PHONE™ are related applications running on different platforms. In one embodiment, a mobile device may run a navigation application, and a vehicle may run a related application that consumes and displays information created by the mobile device application.

The applications may be available from an on-line application store or "App store" that allows users to purchase and download the application code. After a user selects and/or purchases an application, the application code is transferred as a software payload that is downloaded to one or more of the user's devices via a wireless or wired connection. The software payload may include a number of segments that correspond to different devices, platforms or architectures. A single device may receive a software payload that comprises one or more application code segments that are targeted only to the downloading device, targeted only to other devices, or targeted to both the downloading device and other devices.

Once the user has downloaded the software payload to a first device, the code may be loaded onto the first device as a working application. The software payload may also be distributed from the first device to one or more other devices selected by the user. In this way, a second device that is not in communication with the App store may receive new or updated application code from the first device. Third and additional devices may then receive the application code from the first device, the second device, or other devices owned or designated by the user. Each device may load its portion of the code as a runtime application, or it may simply store the code for later transfer to a different device.

An application server may be used to coordinate and monitor the status of the applications and devices. The application server has the capability to monitor the state of the payload installation across multiple devices and to update and synchronize the use of the application on different devices that have received the payload. In this way, the payload may be distributed to device(s) that have the best connectivity to a target device(s). The synchronization of the application installation and distribution state can be used to prune the application off of devices that no longer need to carry the payload. The devices may be used to carry and distribute the payload to similar devices or to different types of devices.

The user may select which devices will be supported by the downloaded application. If purchased from an App store, the choice of devices to be supported by the application may affect the pricing of the application. For example, the cost of an application may be determined based upon the number and type of devices selected by the user. The App store provider or application developer may also adjust pricing by offering both trial versions and actual operating versions of applications. The application developer or App store provider may further control the distribution or use of the application code. For example, the application developer or App store provider may lock the application to specific devices so that even though the payload is stored on a device that is capable of running the code, the device may be blocked from decrypting or installing the application.

The user may designate or identify additional devices to the application server, which will allow the application server to track which devices may be used to download and distribute the applications. When the user adds devices, the application server may allow the user to synchronize all the devices into groups with similar characteristics. For instance, if a user adds three vehicles to his or her account, then a private key may be shared to all of those devices so that installing or running the application is limited only to those vehicles. The payload may be encoded to the private key that specifies only vehicle devices. Accordingly, private keys may be shared to designate device groups so that an application that is allowed run on any particular group may be decrypted and installed or updated by any of the devices in the group. It will be understood that the devices in a group do not need to be similar, but may be selected and organized using any criteria or no criteria. Additionally, the groups may be of any size, including a size of one.

One or more of the devices may have the ability to synchronize the state of the applications across other devices. For example, each device may contain a table or subsection of a master table that lets the device know which applications have been purchased, downloaded, distributed, and/or installed for the various devices the selected for the application. As the devices are connected to or communicate with each other, the device state table may be updated and device state data propagated through the entire system of devices. A master table may be stored exclusively on the application server or on a selected device. Alternatively, several devices or servers may maintain a master table. For example, in one embodiment, there may be two unrelated application store servers that do not talk to each other. A user may have a subset of their devices connected to each server. A master table may be segmented on each device individually to allow each server to access only the information for the user's applications and updates that are associated with that server.

FIG. 1 is a block diagram illustrating an example layout of an application payload that is downloaded from an application store to a device or that is exchanged between two devices. The payload illustrated in FIG. 1 supports three versions of the application code. Three segments of device-specific code 101-103 are included in the application payload. The code for each of the versions is downloaded at the same time. The application payload may optionally include common code 104 that is used by one or more of the device platforms. The common code may be executable binary code, but also may be XML, XAML, HTML, source code, or any other appropriate code, binary, or configuration files. Each payload segment 101-103 may be targeted to a specific device or type of device. When a device is added to the user's account on the application server, a unique public key may be added that will allow the application server to encode each payload individually for the device to which it is targeted. The payload may also be encoded by a device-specific public key. For example, if a user has one-hundred units of a certain device type, then the application server may facilitate loading the application on to all of the devices using the same public key for that device type. The user may also use a common private key for all of the user's devices that synchronizes all of the public keys. This would allow non-user devices to shuttle the application to the user's devices without requiring any intermediate servers to know what is in the payload. A header segment 105 may identify where each targeted-application segment 101-103 or common-code segment begins and ends within the payload.

Figure 2:
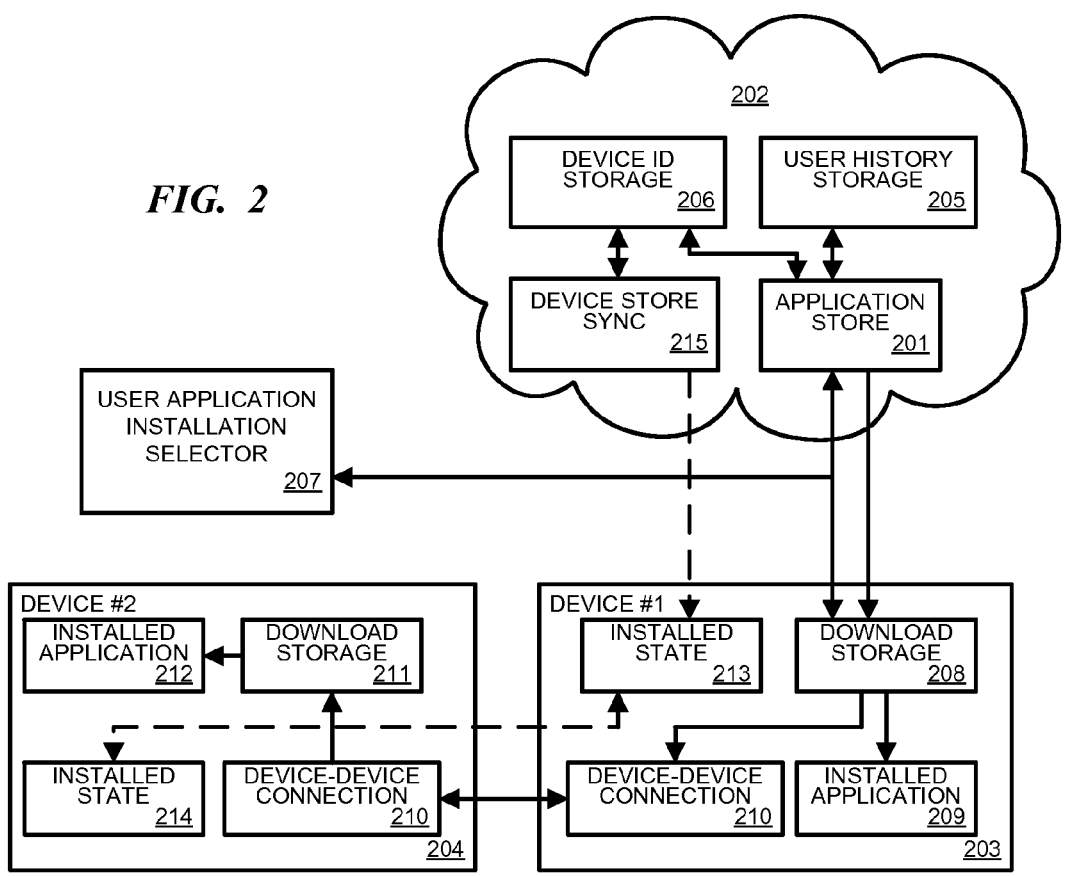
FIG. 2 is a block diagram illustrating an overview of a system that may be used to distribute applications to devices according to one embodiment.

FIG. 2 is a block diagram illustrating an overview of a system that may be used to distribute applications to devices according to one embodiment. Applications are available from an application store 201 that may be located anywhere in cloud 202, which may be a public or private computer network, such as the Internet. Device #1 203 downloads applications from application store 201 and, in some embodiments, passes the application to other devices, such as device #2 204. A user may own or control both device #1 203 and device #2 204. The user purchases or selects applications from application store 201 to be installed on the devices 203, 204.

User history storage 205 contains a listing of all applications purchased and/or downloaded by the users. User history storage 205 further comprises a listing of the devices and/or device types that the user would like the application to be installed upon. User history storage 205 may be part of application store 201 or may be a separate database, memory or other storage device. Device ID storage 206 contains information about the devices associated with the user's profile. Device ID storage 206 may store, for example, device identifiers, device types, and optional encryption keys for the devices. Device ID storage 206 may be part of user history storage 205 or may be a separate database, memory or other storage device.

The user selects an application from application store 201 to be downloaded and installed on multiple devices 203, 204. The devices 203, 204 may be of the same type and, therefore, use the same application code. Alternatively, devices 203, 204 may be of different types and, therefore, require different application code to run or support a selected application. The user may select applications using a device 203 that is connected to the application store 201 and that will receive the downloaded application code. In other embodiments, the user may access the application store 201 using an independent device 207, such as a personal computer or web terminal, that allows the user to select the application to be installed and the devices to receive the applications.

Once the applications have been selected by the user, application code is downloaded device 203, which is connected to the application store via a wireless or wired, direct or indirect link. The application code may be downloaded directly to multiple devices if they are connected to the application store 201.

If the user has selected a device 204 that is not connected to the application store 201, then the application code for the unconnected device 204 is sent to a connected device 203. The application code for unconnected device 204 may be combined into a single package with the application code for device 203 as illustrated in FIG. 1. Alternatively, the application code for device 204 may be sent as an independent or stand-alone payload to device 203.

The application code from application store 201, which may be designated for device 203 and/or device 204, is stored in download storage 208 on device 203. The application code that is designated for device 203 is then loaded as an installed application 209.

Later, when device 203 is brought into connectivity with device 204, the two devices establish a connection. A device-to-device connection module 210 may provide a wired or wireless connection between devices 203 and 204. For example, device-to-device connection module 209 may provide a wired Ethernet or USB connection or a wireless Bluetooth or WiFi connection between the devices. The devices 203, 204 transfer the application code that is required to run the application on device 204. This may include the entire original application code that was provided by application store 201 to device 203 or may comprise just a portion of the application code that was originally provided from application store 201.

Device 204 stores the application code in download storage 211 and loads the application code as an installed application 212. Once the application code for device 204 has been transferred from device 203 to device 204, then device 203 may optionally remove the device 204 application code from its download storage 208. Device 203 no longer needs the application code after the payload has been delivered to device 204.

Device 203 further comprises an installed state store 213 that monitors the status of application code stored in download storage 208 and the installed applications 209 on device 203. Installed state store 213 further monitors and records the status of application code that has been shared with other devices, such as device 204. Device 204 also comprises installed state store 214. The devices may share installation information in one embodiment. Accordingly, when device 203 connects to device 204 and transfers the application code to device 204, the state of each device may be updated on their respective installed state store 213, 214. In other embodiments, a device may record the application status only for itself.

A central device store sync 215 may keep track of all of the user's devices and applications. When device 203 connects to the cloud 202, the state of device 203—and possibly device 204—is synced to the application service in cloud 202 so that the user's other devices (not shown) will also know when device 204 has received the application code. This will allow the user's other applications to delete any payload related to device 204 for the application.

Figure 3:
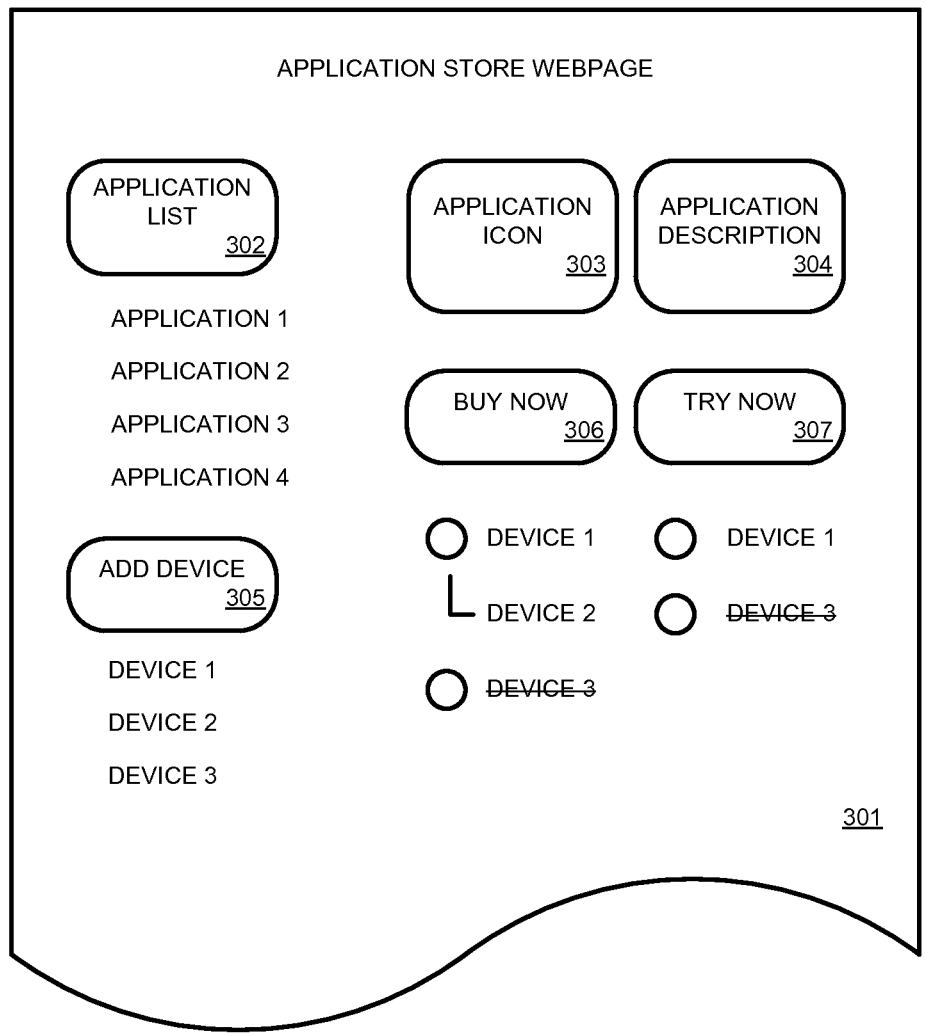
FIG. 3 illustrates an example of an application store download webpage according to one embodiment.

FIG. 3 illustrates an example of an application store download page 301. It will be understood that page 301 is merely a simplified example of an application store webpage that is used to highlight features of the system described and disclosed herein. A user may select applications from a list 302 or using a search feature, for example. When the user selects an application from list 302, an icon 303 and/or description 304 of the application are displayed.

The user may identify a list of his or her devices using an add device feature 305. In the example of FIG. 3, the user has identified three devices. The user is offered the opportunity to purchase 306 or test 307 the selected application. The webpage indicates which devices are appropriate for the selected application. For example, device 3 is crossed out, which may indicate that the selected application is not compatible with the selected device. Alternatively, a device may be hidden if it not compatible with the selected application. For example, device 2 is missing from the trial list under feature 307, which may mean that there is no trial available for that application or that device. In some cases, an application may be available as a package. For example, in the illustrated example, if the user purchases the application for device 1 then the application is also provided for device 2 as indicated under feature 306.

Consider webpage 301 as illustrating an application selected by the user to play Internet radio. If device 1 is a mobile device, such as a cellular phone, then it may have an Internet capability. If device 3 is a navigation device, such as a GPS device, that does not have an Internet capability, then the selected Internet radio application would not have a version that is compatible with device 3. Accordingly, device 3 is indicated as not being compatible. Device 2 may not have direct Internet capability, but it might be able to access the Internet using device 1, such as when device 1 acts as an Internet "hot spot" or access point. Accordingly, device may not have a standalone version of the Internet radio application, but the developer may create a companion application for device 2 that allows device 2 to play Internet radio when device 1 is nearby.

Figure 4:
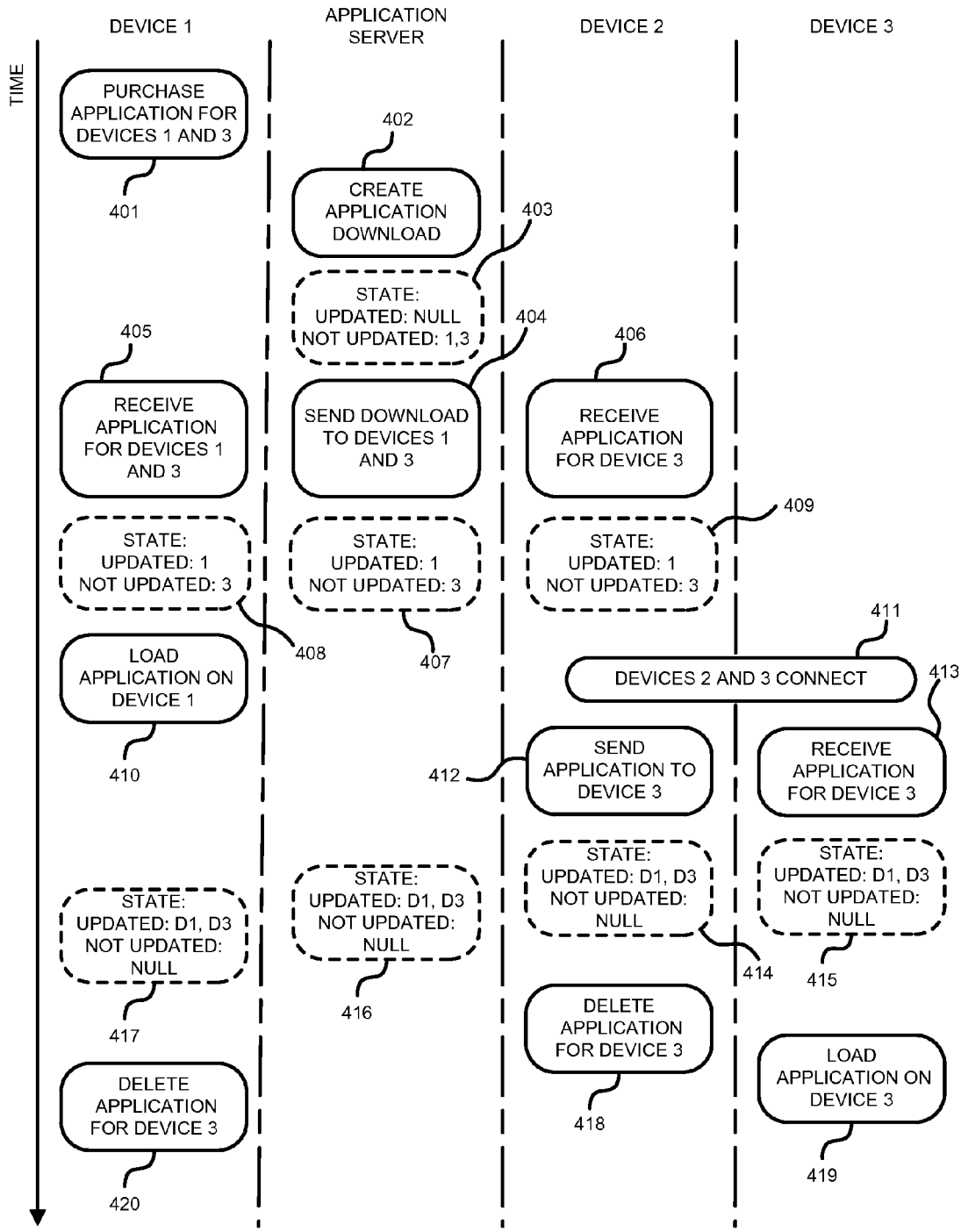
FIG. 4 is a flow diagram illustrating a process or method for distributing application code to multiple devices.

FIG. 4 is a flow diagram illustrating a process or method for distributing application code to multiple devices. In the example illustrated in FIG. 4, a user has three devices, which may be associated with an account or user profile, for example. A first device and a second device are always connected to the Internet, but a third device is not connected to the Internet. Device 3 might be never connected to the Internet or only intermittently connected so that it remains disconnected during the operation illustrated in FIG. 4.

In step 401, the user selects or purchases an application to run on device 1 and device 3 from an application server. The application server creates an application download package in step 402. The application download may be two separate application payloads that are each targeted to a specific device. Alternatively, the application download may be a single application payload having separate segments or portions designated for devices 1 and 3. The status of the user's devices with respect to the purchased application is shown in state 403. None of the user's devices have been updated, and devices 1 and 3 are not yet updated.

In step 404, the application server begins sending the application download to device 1 and device 2, which may communicate with the application server via an Internet connection. In step 405, device 1 receives the application download, which includes application code for both device 1 and device 3. In step 406, device 2 receives the application download with an application payload targeted to device 3 only.

Along with receiving the application code in steps 405, 406, devices 1 and 2 also receive state information for that application from the application server. The application server knows that device 1 received the application code directly in steps 404-405 and that device 2 received the application code directly in steps 404-406. Application server updates the application status information in state 407, which indicates that device 1 has been updated. This state information is passed on to devices 1 and 2 as state 408 and 409, respectively. Because the application server is not yet aware of any connection to device 3, the state of device 3 is indicated as not updated in states 406-408.

After device 1 has received the full application code in step 405, it then loads or installs the application in step 410. In one embodiment, state information may be updated on device 1 and passed to the application server and other devices to indicate that device 1 has not only received the application code, but also successfully installed the application.

In step 411, devices 2 and 3 establish a connection, which may be a wired connection, such as via an Ethernet or USB cable, or a wireless connection, such as a Bluetooth or WiFi connection. Device 2 recognizes device 3 as the intended destination for the application download. In step 412, device 2 begins transferring the application to device 3. In step 413, device 3 receives the application from device 2.

Along with receiving the application code in step 413, device 3 also receives state information for that application from the device 2. Device 2 and 3 update their respective status information in states 414 and 415, which indicates that devices 1 and 3 have been updated and that no devices remain to be updated. Eventually, device 2 will send that status to the application server, which will in turn propagate the status to device 1. The application server updates the application status information in state 416 and device 1 updates state 417.

In step 418, device 2 deletes the application from its memory because it no longer needs to keep a copy for device 3. After device 3 has received the full application code, it loads or installs the application in step 419. In step 420, device 1 deletes the application code for device 3 because it knows that device has already received the application from another source as indicated in state 417

It will be understood that steps 401-420 of the process illustrated in FIG. 4 may be executed simultaneously and/or sequentially. It will be further understood that each step may be performed in any order and may be performed once or repetitiously.

Figure 5:
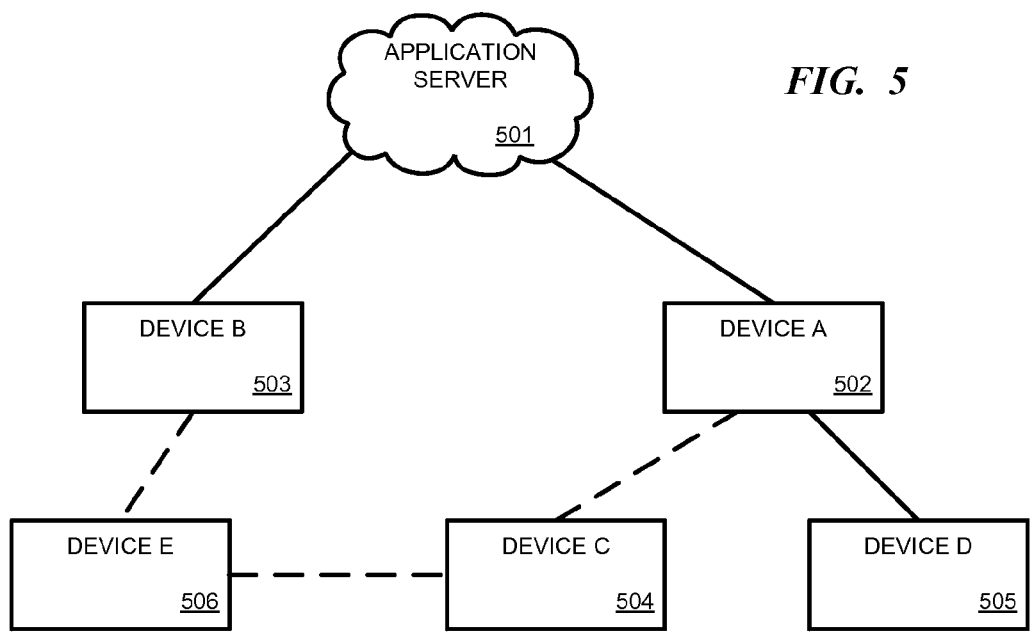
FIG. 5 is a block diagram of a system illustrating the relationship of multiple devices according to one embodiment.

FIG. 5 is a block diagram of a system illustrating the relationship of multiple devices according to one embodiment. The solid lines between application server 501 and devices A 502 and B 503 and between device A 502 and device D 505 represent constant connections. The dashed lines between the devices represent connections that are not constant and that change over time. The following illustrates one example of how a state database may be updated for this system.

Application server 501 has a global state table that is a superset of all states for devices 502-506. Each of the devices 502-506 have a subset of the global state table, which may be the entire table from server 501. The table may include, for example, the state of other devices that are relevant to each individual device. Application server 501 may decide which state information to provide to devices 502-506. In one embodiment, devices 502-506 may exchange all known state information with each other to support the flow of state data to application server 501.

All of the devices begin with an updated or neutral state. The user buys an application that he or she intends to use on all devices. For simplicity, this example assumes that the application runs the same code on all devices 502-506. However, in other embodiments, each device may run different application code, which may be tracked by the application state table.

Application server 501 creates a section of the global state table that indicates that all devices 502-506 should receive the application, but do not currently have the application. The application server 501 then downloads the application to devices A and B via direct connections. Devices A and B install the application. Device A now has the state that the application is installed, and device B has the state that the application is installed. Devices A and B synchronize their respective state data with the application server 501. Thus, application server 501 records that devices A and B have the application.

Application server 501 may then push state information to device B that device A has the application and to device A that device B has the application. Thus, the application server 501, device A and device B have a state record that devices A and B have the application installed, but that the application is not installed on devices C, D, and E.

Device A then immediately sends the application to device D along with the current state data. Device D does not know the state of the application install until device A tells it. Device D installs the application on itself. Device D now has the record that devices A, B and D have the application. This information is transmitted to device A, which records that device D now has the application. Device A also communicates this status to application server 501, which records the most current status data and also sends the updated state data to device B.

Then device A and device C connect, device C will download and install the application. Device A also provides current state information to device C. Upon installing the application device C informs device A of its updated state, and device A in turn informs the application server 501 and device D that device C has the application installed. Application server 501 then informs device B that device C has the application installed. As a result, devices A, B, C, D and application server 501 are all aware that those devices have the application installed and that device E does not have the application. Eventually, devices A and C disconnect.

Devices E and C then connect via a temporary connection. Device C sends the application payload to device E, which installs the application. At this time, device E informs device C that the application has been installed. Device C now knows that all of the devices 502-506 have the payload and, therefore, deletes the application payload from its memory but leaves the application installed. Device E also knows that all of the devices 502-506 have the application installed and, therefore, device E also deletes the application payload but leaves the application installed. At this time, the application server 501 and devices A, B, and D only know that device A, B, C, and D have the application. Eventually, devices E and C disconnect.

Devices E and B then connect via a temporary connection. Devices B and E synchronize their states, and device B learns that device E has the application installed. Device B then deletes the application payload and records that all devices have the correct state.

Device B and the application server 501 synchronize, and then the application server synchronizes with device A, which deletes the application payload from memory. When device A synchronizes with device D, device D deletes the application payload and updates its state table. At this point, all devices 502-506 have the application installed and their individual state tables reflects this status.

In another embodiment, devices 502-506 are configured in a static configuration as illustrated in FIG. 5, and this configuration is known to each device. Accordingly, device D knows that there is no reason to store the application payload after it is loaded because device D has no anticipation that it will connect with devices C or E. So, after loading the application, device D will delete the application payload after it is installed.

The following use cases are provided as non-limiting examples that illustrate the exchange of application code and application status information among different types of devices.

EXAMPLE #1

The user owns a tablet computer, a smart phone, and a vehicle navigation system that all implement the application exchange procedure. In this example, the user downloads an application and has selected to send the application to all three devices. The server may package the application so that device-specific code is placed in separate segments of the download and code common to all platforms is placed in a common-code segment. For example, if all of the platforms run the same architecture for their main processors, then they will share some common code for the application. The application code is initially downloaded to the tablet computer on which the user made the purchase.

Later in the day, when the tablet computer is brought in contact with the smart phone, the two devices connect to each other and the payload for the smart phone is transferred along with the common code. Thus the application is downloaded and installed to the smart phone. The code for the vehicle navigation system does not need to be transferred to the smart phone because it is not required to load or run the application on the smart phone. The tablet computer is then brought near or into the vehicle and those two devices connect. The application code segment and the common code is then downloaded to the vehicle navigation system. As a result, all three devices have received a copy of the application.

EXAMPLE #2

Further to the case of Example #1, when the application is transferred from one device to another device, the payload for the receiving application may be removed from the source device. For example, when the application code is transferred to the smart phone, the tablet computer will delete the application code for the smart phone from its memory because this code is no longer needed. The deleted payload is the smart phone-specific payload, which has already been delivered.

EXAMPLE #3

Further to the case of Example #1, when the payload is transferred to the smart phone, the application payload for the vehicle is also transferred with the smart phone payload. In this case, the smart phone may then also act as a source of the application code for the vehicle.

EXAMPLE #4

Further to the case of Example #1, the server from which the application was purchased and downloaded may also encrypt the payloads to specific devices. The application server may use a security key to ensure that only specific devices can decrypt and use the application.

EXAMPLE #5

Further to the case of Example #1, all of the devices contain a store that identifies which applications were bought for the device by the user. The store also records the applications that are known to exist on other devices. Thus, the store contains not only the applications that have been installed on the device, but it also indicates the install state of other devices that the device has connected with. This information may be synchronized to other devices and servers as the device connects to them.

EXAMPLE #6

Further to the case of Example 5, a device maintains a store that contains not only applications that are on the device but may also contain applications from other devices.

EXAMPLE #5

Further to the case of Example 5, a device may retrieve and synchronize the data store and then utilize this data to delete payloads that are no longer needed by the device. The device status data may be retrieved from other devices or other servers.

EXAMPLE #7

The user has a network of sensor devices and he or she would like to buy an application for all of the sensor devices. In this case, the user has a gateway to the sensor network such as a sensor device that is connected to the Internet. The user buys an application set, which may comprise one-hundred sensor applications plus an application for the gateway device. The gateway device is connected to the Internet and the system downloads the application payloads that contain the gateway application and the sensor applications. The sensor devices then download the application code from the gateway device. In this way each sensor device receives the application code and installs the application.

EXAMPLE #8

Further to the case of Example #7, the gateway device may maintain state information for the sensor devices, such as which applications are installed or not installed on each sensor device. This information is not transmitted to the server. Instead, the gateway device is the state holder for the sensor devices, which connect only to the gateway. In this example, the user may need a license to distribute the application code to some number of sensor devices. Alternatively, the gateway may control installation of the application code based on a policy sent from the application server.

EXAMPLE #9

Further to the case of Example #8, the sensors may connect to the application server and download the application. However, the status information is transferred to the gateway device so that the gateway device can store this state information without requiring the application server to know which sensor devices have which applications.

EXAMPLE #10

The user has two devices, a smart phone and a vehicle navigation system, which are both ARM processors running the same operating system (OS). The user purchases an application that can run on both the smart phone and the vehicle navigation system, but the user only buys the rights to use the vehicle navigation embodiment of the application. The application server encrypts the application code using a public key for the vehicle navigation device. The application server may have this public key, for example, from when the user added their devices to an online persona. The public key may have been uploaded along with other device data. The application server knows that the vehicle navigation system rarely, if ever, has connectivity to the Internet but the navigation system commonly communicates with the user's smart phone. The application server thus packages the application payload and uploads it to the smart phone. In this case, the smart phone could have run the unencrypted application, but because the smart phone does not have the private key for the navigation system, the smart phone cannot install the application. This gives the application developer and the application store provider confidence that the application is only run on the vehicle navigation device and not on an unlicensed smart phone.

EXAMPLE #11

The user has ten tablet computers that are never connect to the public Internet. In this case, these devices are only used in a warehouse environment, and they all communicate through a gateway device in the warehouse that only permits access to the enterprise intranet services. The user buys an application for the tablet computers. The application server downloads a payload to the gateway device. The payload is encrypted with a public-private key that is common to all ten tablet devices. The gateway device pushes the application code to all of the tablet computers that are currently connected, but three tablet computers are not connected to the gateway. Thus, the seven currently connected tablet computers will install the application and will keep the application payload. When the installed tablets later communicate with the three tablets that are not yet installed, the installed tablet computers will send the application payload and will update their state data to indicate that another tablet now has the application. The tablets in this transaction keep the application payload because some other tablets have not yet installed the application according to their internal state table. The tablet computers update their state table periodically either through transferring a payload or synchronizing the state information with another device or the server. When the state table for the device indicates that all of the tablets are updated, then the payload is removed from each of the tablets. In this way, each tablet computer keep the application payload alive based on their internal bookkeeping regarding whether or not the payload may still be needed to update another device.

EXAMPLE #12

Further to the case of Example 11, however all three of the non-installed tablet computers are geographically distinct and have never communicated with or connected each other. In this case, the table computers know that they never communicate with the other devices and—based on a policy either from the user or an internal engine—the tablet knows it will never see a particular device. Thus, when one of the initial seven tablets comes in contact with one of the three geographically distinct tablets, the device receiving the application payload will not store the application code after install since that tablet knows that it will never have the opportunity to update the other two uninstalled tablets. In this way, the connectivity history is incorporated into the system and is used to ensure that memory space is not wasted on the devices.

Figure 6:
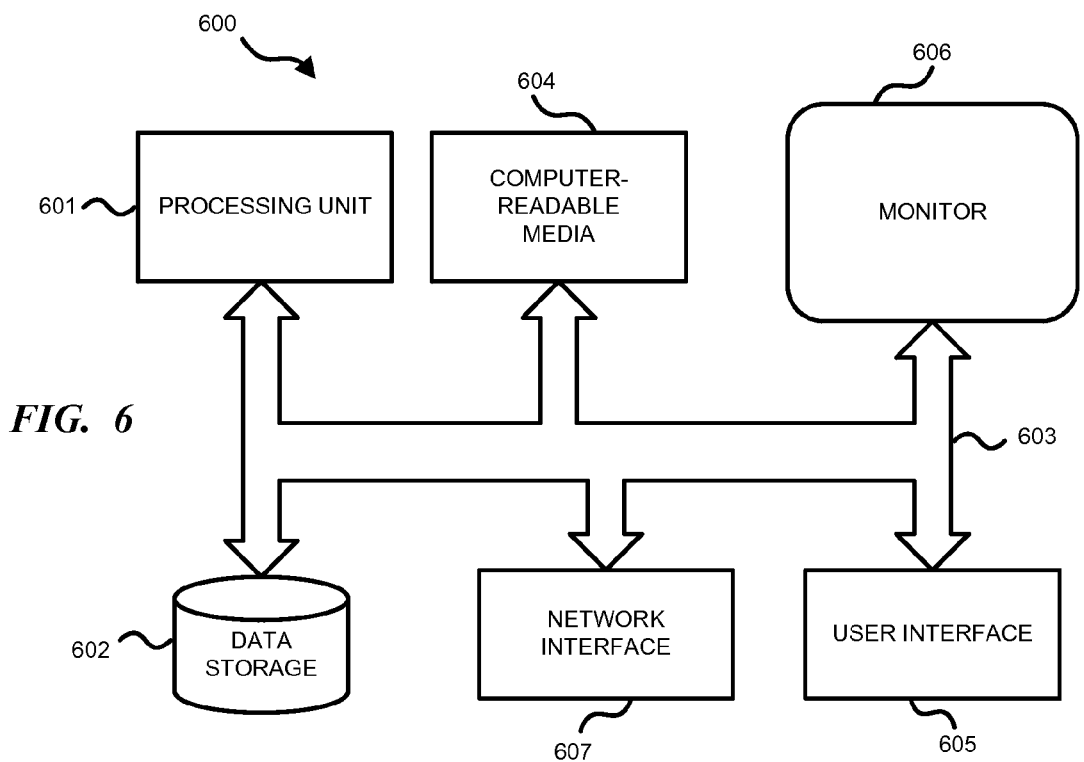
FIG. 6 illustrates an example of a suitable computing and networking environment on which a system for downloading application code according to one embodiment.

FIG. 6 illustrates an example of a suitable computing and networking environment 600 on which a system for downloading application code as shown in the examples of FIGS. 1-5 may be implemented. The computing system environment 600 is only one example of a suitable computing environment, such as an application server or user device, and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 600. Components may include, but are not limited to, various hardware components, such as processing unit 601, data storage 602, such as a system memory, and system bus 603 that couples various system components including the data storage 602 to the processing unit 601. The system bus 603 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 600 typically includes a variety of computer-readable media 604. Computer-readable media 604 may be any available media that can be accessed by the computer 600 and includes both volatile and nonvolatile media, and removable and non-removable media, but excludes propagated signals. By way of example, and not limitation, computer-readable media 604 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 600. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 602 includes computer storage media in the form of volatile and/or nonvolatile memory such as read only memory (ROM) and random access memory (RAM). A basic input/output system (BIOS), containing the basic routines that help to transfer information between elements within computer 600, such as during start-up, is typically stored in ROM. RAM typically contains data and/or program modules that are immediately accessible to and/or presently being operated on by processing unit 601. By way of example, and not limitation, data storage 602 holds an operating system, application programs, and other program modules and program data.

Data storage 602 may also include other removable/non-removable, volatile/nonvolatile computer storage media. By way of example only, data storage 602 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 6, provide storage of computer-readable instructions, data structures, program modules and other data for the computer 600.

A user may enter commands and information through a user interface 605 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 601 through a user input interface 605 that is coupled to the system bus 603, but may be connected by other interface and bus structures, such as a parallel port, game port or a universal serial bus (USB). A monitor 606 or other type of display device is also connected to the system bus 603 via an interface, such as a video interface. The monitor 606 may also be integrated with a touch-screen panel or the like. Note that the monitor and/or touch screen panel can be physically coupled to a housing in which the computing device 600 is incorporated, such as in a tablet-type personal computer. In addition, computers such as the computing device 600 may also include other peripheral output devices such as speakers and printer, which may be connected through an output peripheral interface or the like.

The computer 600 may operate in a networked environment using logical connections 607 to one or more remote computers, such as a remote computer. The remote computer may be a personal computer, a server, a router, a network PC, a peer device or other common network node, and typically includes many or all of the elements described above relative to the computer 600. The logical connections depicted in FIG. 6 include one or more local area networks (LAN) and one or more wide area networks (WAN), but may also include other networks. Such networking environments are commonplace in offices, enterprise-wide computer networks, intranets and the Internet.

When used in a LAN networking environment, the computer 600 may be connected to a LAN through a network interface or adapter 607. When used in a WAN networking environment, the computer 600 typically includes a modem or other means for establishing communications over the WAN, such as the Internet. The modem, which may be internal or external, may be connected to the system bus 603 via the network interface 607 or other appropriate mechanism. A wireless networking component such as comprising an interface and antenna may be coupled through a suitable device such as an access point or peer computer to a WAN or LAN. In a networked environment, program modules depicted relative to the computer 600, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A first device, comprising:
   a network interface configured to establish a network connection between the first device and a second device, wherein the first device comprises a first execution platform, and wherein the second device comprises a second execution platform;
   a persistent memory configured to store a header and one or more payloads received from a server over the network interface, the one or more payloads containing application code for devices of the first platform, application code for devices of a second platform, and common code for devices of the first platform and devices of the second platform, wherein the common code is distinct from the header and includes executable binary code loadable as a runtime application, wherein the first device is capable of executing the runtime application but cannot install the runtime application on itself; and
   a processor coupled to the network interface and to the persistent memory, the processor configured to execute instructions that cause the first device to:
   receive the one or more payloads;
   store the one or more payloads to the persistent memory;
   transmit at least a part of the application code for the devices of the second platform and at least part of the common code to the second device based at least in part upon the detection of the network connection to the second device, wherein the second device can install the runtime application on itself; and
   update a device state table to indicate the second device has an installed state corresponding to the transmitted code, wherein the device state table tracks installation of application code from the one or more payloads.

2. The first device of claim 1, wherein each of the one or more payloads is divided into a plurality of segments, wherein a first segment contains application code for devices of the first platform, and wherein a second segment contains application code for devices of the second platform.

3. The first device of claim 1, wherein a first payload of the one or more payloads contains application code for devices of the first platform, and wherein a second payload of the one or more payloads contains application code for devices of the second platform.

4. The first device of claim 1, wherein the processor is further configured to execute instructions that cause the first device to:
send a notification message indicating that application code from the one or more payloads was installed on the first device.

5. The first device of claim 4, wherein the processor is further configured to execute instructions that cause the first device to:
send a notification message indicating that application code from the one or more payloads was provided to the second device.

6. The first device of claim 1, wherein the processor is further configured to execute instructions that cause the first device to:
delete the application code installed on the first device from the persistent memory.

7. The first device of claim 1, wherein the processor is further configured to execute instructions that cause the first device to:
delete the application code transmitted to the second device from the persistent memory.

8. A method for distributing application code from a first device, the method comprising:
receiving, from a server over a network, a header and one or more payloads containing application code for devices of a first platform type, application code for devices of a second platform type, and common code for devices of the first platform type and devices of the second platform type, wherein the common code is distinct from the header and includes executable binary code loadable as a runtime application, and wherein the first device is capable of executing the runtime application but cannot install the runtime application on itself;
storing the one or more payloads to a persistent memory;
establishing a network connection between the first device and a second device, wherein the second device is of the second platform type;
transmitting at least a part of the application code for devices of the second platform type, and at least part of the common code to the second device, wherein the second device can install the runtime application on itself; and
updating a device state table to indicate the second device has an installed state corresponding to the transmitted code, wherein the device state table tracks installation of application code from the one or more payloads.

9. The method of claim 8, wherein each of the one or more payloads is divided into a plurality of segments, wherein a first segment contains application code for devices of the first platform type, and wherein a second segment contains application code for devices of the second platform type.

10. The method of claim 8, wherein a first payload of the one or more payloads contains application code for devices of the first platform type, and wherein a second payload of the one or more payloads contains application code for devices of the second platform type.

11. The method of claim 8, further comprising:
sending a notification message indicating that application code from the one or more payloads was installed on the first device.

12. The method of claim 11, further comprising:
sending a notification message indicating that application code from the one or more payloads was provided to the second device.

13. The method of claim 8, further comprising:
deleting the application code installed on the first device from the persistent memory.

14. The method of claim 8, further comprising:
deleting the application code transmitted to the second device from the persistent memory.

15. The method of claim 8, further comprising:
tracking every transmittal of the application code from the one or more payloads.

* * * * *